April 15, 1924.

U. S. EBERHARDT 1,490,457

METHOD OF AND HOB FOR CUTTING GEARS

Filed March 11, 1922    2 Sheets-Sheet 1

INVENTOR
Ulrich Seth Eberhardt
BY
Everett Rook,
ATTORNEYS.

April 15, 1924.
U. S. EBERHARDT
1,490,457
METHOD OF AND HOB FOR CUTTING GEARS
Filed March 11, 1922  2 Sheets-Sheet 2
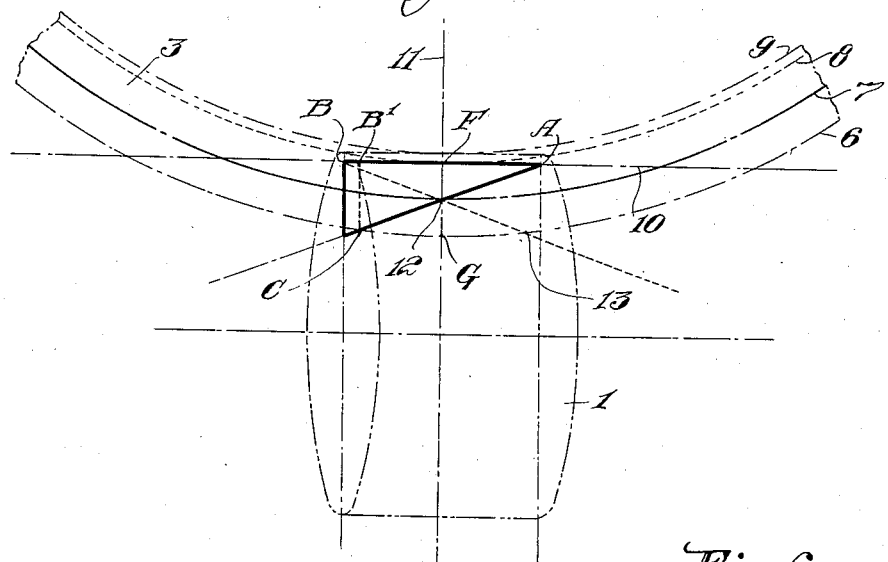
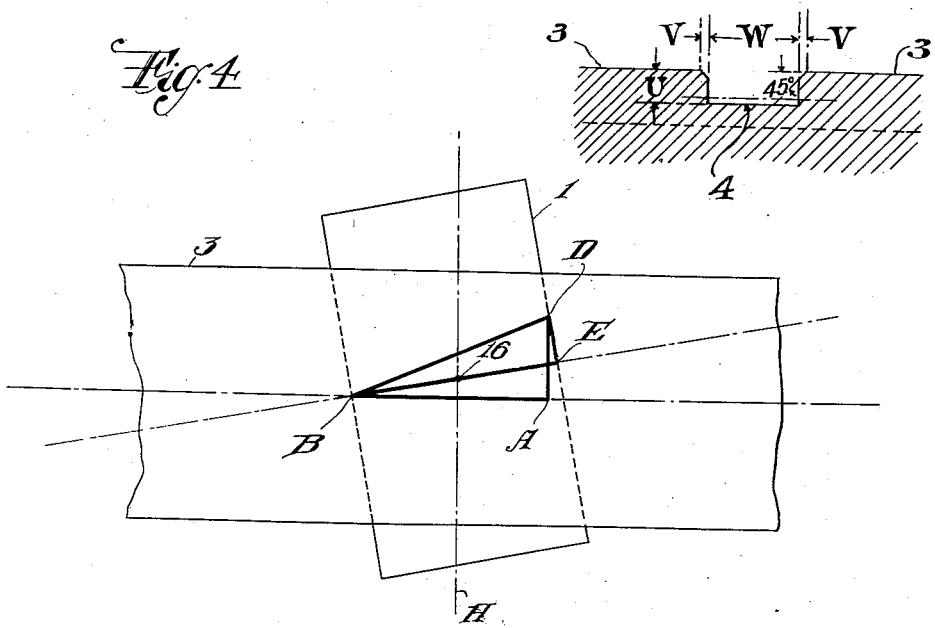
INVENTOR
Ulrich Seth Eberhardt
BY
Everett Rook,
ATTORNEYS.

Patented Apr. 15, 1924.

1,490,457

UNITED STATES PATENT OFFICE.

ULRICH SETH EBERHARDT, OF MAPLEWOOD, NEW JERSEY.

METHOD OF AND HOB FOR CUTTING GEARS.

Application filed March 11, 1922. Serial No. 542,847.

*To all whom it may concern:*

Be it known that I, ULRICH SETH EBERHARDT, a citizen of the United States, and a resident of Maplewood, in the county of Essex and State of New Jersey, have invented new and useful Improvements in Methods of and Hobs for Cutting Gears, of which the following is a specification.

This invention relates in general to a helical cutter or "hob" of the cylindrical type having cutting teeth arranged helically around its periphery for use in the cutting of gears by the molding generating process, commonly known as the "hobbing" process. More particularly the invention relates to a hob specially designed for use in cutting herringbone gears.

In cutting herringbone gears by a molding generating process, a clearance groove between the right and left hand portions of the gear is necessary to prevent the cutter in cutting the teeth on one portion from cutting into the teeth of the other portion. It is extremely desirable that this clearance groove be narrow as possible to economize on stock and space, and this clearance groove is becoming standardized in width for various sizes of teeth because of the common use of either of two known methods of cutting herringbone gears. In one method a multiple thread hob of a small diameter is used with its axis set at right angles to the work axis, and in the other method a "stock" hob of usually single thread is used with its axis set at an angle to the work axis, said angle being either the sum or the difference of the work and hob helix angles, depending on whether the hob is of a different hand or of the same hand as the work, respectively. The first described method, due to the hob being set at right angles to the axis of the work, has made possible the use of a clearance groove substantially narrower than has been possible with the second method.

A concise comparison of the usual widths and depths of clearance grooves provided when utilizing the known hobs in accordance with the known two methods, can be had from the following tables read in connection with Figure 6 of the accompanying drawings. Table No. 1 relates to the practice of the first mentioned method and Table No. 2 to the second mentioned method.

Table No. 1.

| Diametral pitch. | W. | V. | U. | No. of threads in hob. |
|---|---|---|---|---|
| 8 | $\frac{1}{8}$ | $\frac{3}{16}$ | $\frac{1}{8}$ | 4 |
| 6 | $\frac{1}{4}$ | $\frac{1}{4}$ | $\frac{3}{16}$ | 4 |
| 3½ | 1 | $\frac{1}{4}$ | $\frac{5}{16}$ | 3 |
| 1¼ | 2$\frac{5}{16}$ | $\frac{7}{16}$ | $\frac{11}{16}$ | 3 |

Table No. 2.

| Diametral pitch. | W. | V. | U. | No. of threads in hob. |
|---|---|---|---|---|
| 6 | 1$\frac{5}{16}$ | $\frac{7}{16}$ | $\frac{3}{16}$ | 1 |
| 3½ | 1$\frac{11}{16}$ | $\frac{5}{16}$ | $\frac{1}{4}$ | 1 |
| 1¼ | 2$\frac{11}{16}$ | $\frac{7}{16}$ | $\frac{1}{2}$ | 1 |

This first described method has many disadvantages. To obtain the desired helix angle of gear, usually 23°, with the hob axis at 90° to the work axis, it is necessary to have the hob helix angle equal to the complement of the work helix angle, or usually 67°. This requirement of hob helix angle can be met practically only by making the hob of multiple thread, usually triple or quadruple, and multiple thread hobs have inherent disadvantages in generating tooth curves. First, it is difficult to accurately space the threads, and second, teeth formed by multiple thread hobs have a plurality of distinct flat surfaces which must be eased off and the more prominent bumps removed by grinding, often with sand and oil. These flats are most prominent when the number of teeth in the gear, the number of threads on the hob and the number of flutes on the hob, all contain a common factor.

The use of a single thread eliminates the above objections, but up to the present time the stock or standard generating hob has the objectionable feature of requiring a wider clearance groove on herringbone gears, due to the necessity of swiveling a single thread hob so that the helix containing the cutting teeth will coincide with the helix of the work. It is impracticable to make a single thread hob of the small diameter necessary to obtain a helix angle equal to the work helix angle complement, which would obviate the necessity of swiveling the hob.

The primary object of my invention is to provide a novel, simple and economically produced hob and a method of using the same, whereby a herringbone gear can be produced with a clearance groove of minimum width and whereby the objections to both the known multiple and single thread hobs are eliminated.

Further objects of the invention are to provide a hob, preferably with single thread, which is substantially shorter than the present known hobs and which can be arranged with its axis set at an angle less than 90° to the work axis according to the second described method, so that the full molding generating action is obtained, and so as to cut a herringbone gear with a clearance groove of minimum width; to provide such a hob substantially all of whose teeth cross the line of tooth action of the gear so that substantially every tooth assists in the cutting of a gear; to thus provide a hob whose length is governed primarily by the length of the line of action, the pressure angle and the working depth of the teeth of a gear to be cut, and the angle of the hob axis to the work axis during the cutting operation, and to obtain other results and advantages as may be brought out by the following description.

Referring to the accompanying drawings in which like numerals of reference indicate the same parts throughout the several views, Figure 1 is a perspective view of a hob embodying my invention in cutting relation to a herrinbone gear, the hob being viewed from a plane parallel to the axis of the gear being cut;

Figure 3 is a diagram of the gear and the hob viewed in the plane of rotation of the gear and showing the line of involute action of the gear and the hob;

Figure 4 is a top plan diagram of a helical gear and the hob viewed from a plane parallel to an axial plane of the gear and showing the line of cutting action of the hob on the gear, Figure 6 is a fragmentary diagrammatic sectional view of a herringbone gear showing the clearance groove.

Figure 1:
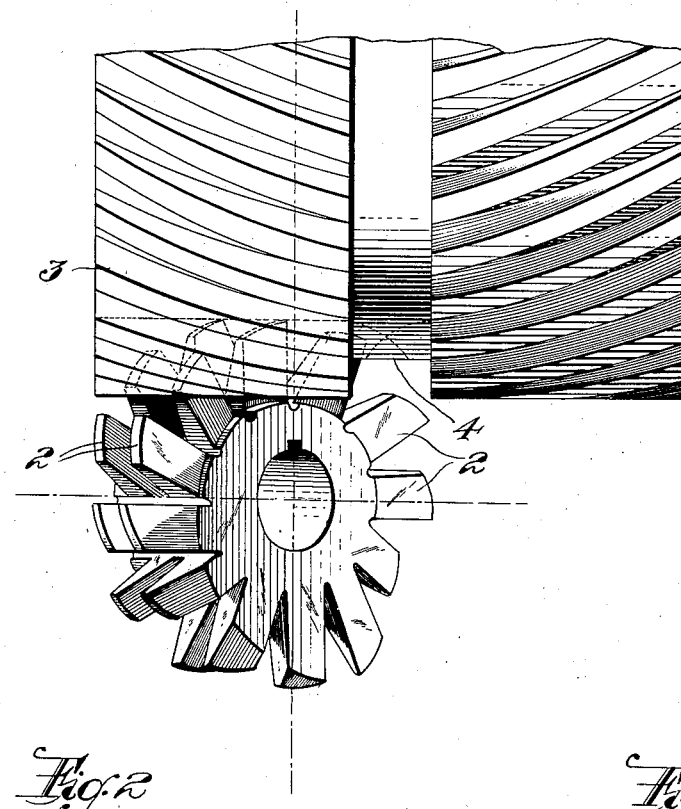

In the drawings, the reference character 1 designates my hob which is shown as provided with a plurality of cutting teeth 2 of usual form arranged in a single helix on its periphery. When using the hob for cutting helical gears, particularly a herringbone gear such as indicated at 3, the hob is arranged with its axis at an angle to the axis of the gear so that the hob thread and gear space coincide, as shown in Figures 1, 3 and 4. The length of my hob is such that a narrow clearance groove 4 on the gear 3 is permitted and at the same time a full molding generating action obtained.

With particular reference to Figures 3 and 4 of the drawings which diagrammatically show the values determining the length of my hob, the reference character 3 designates a gear of which line 6 indicates the outside circle, line 7 the pitch circle, line 8 the working depth circle, and line 9 the circle determining the full depth of the gear teeth. The chord 10, tangent to the circle 8, contains the path of a mating involute rack and forms a segment whose height is equal to the working depth of the desired tooth. The line 11 is a radius line of the gear which intersects the chord 10 at right angles, and also intersects the pitch and outside circles 7 and 6. The line of involute action, A. C., for one cutting edge of the hob passes through the point of intersection 12 of the line 11 and pitch circle 7 at an angle to the chord 10 equal to the pressure angle of the tooth desired. Point A, where the line of action meets the mating involute rack path 10, determines one end of the involute gear tooth action, and point C, where the line of action meets the outside circle 6, determines the other end of the tooth action. The line of action for the other cutting edge of the hob is indicated by line B. 13.

In a system of gearing composed of gears and pinions of all possible numbers of teeth, the length of line B'. C., at right angles to A. B., varies, being shortest in the smallest pinion and longest in the largest gear. In a gear of infinite radius, or a straight rack, the line B'. C. equals the line F. G. I prefer to make the hob for the largest possible gear, and therefore its length viewed in a plane at right angles to the work axis, is equal to the length of the line A. B. A hob of this length is particularly advantageous as it is adapted for cutting both the right and left hand parts of the gear 3, and has a central position in relation to the work axis, or to line 11. This is due to the fact that it contains both lines of action A. C. and B. 13, and includes all cutting conditions. It is obvious that a hob may be used having a length equal to A. B'. for cutting either side of the gear, but care would be necessary in setting such a hob a proper distance off center to provide for cutting action to include the respective line of action A. C. or B. 13.

The length A. B. of the hob is best found by the formula, A. B.=cot B. A. C.×F. G. In use, the hob is swiveled, or has its axis arranged, at an angle less than 90° to the work axis, and the actual length of the hob is dependent on the length of line A. B. and the said angle of swivel. This angle is illustrated in Figure 4, and indicated A. B. E. The actual length of the hob as shown is thus equal to the length of line B. E. It is best practice to hob helical gearing with a hob of the same hand helix as the gear to be cut, and under these conditions the angle A. B. E. is the difference between the work helix angle and the hob helix angle, indicated on Figure 4 as A. B. D. and D. B. E., respectively. The line A. B. forms part of the triangle A B. D., in which the angle A. B. D. is the work helix angle and the line B. D. represents the hob length normal, or at an angle of 90° to the hob helix. The length B. D.=A. B.×secant A. B. D., or, in other words, B. D.=working depth of tooth × cotangent of pressure angle × secant of the work helix angle. This line B. D. forms part of the triangle D. B. E., in which the angle D. B. E. is the hob helix angle and the line B. E. represents the actual length of the hob measured parallel to its axis. Thus, the length B. E.=B. D.× cosine D. B. E., or, in other words, B. E.= thread working depth × cotangent of pressure angle × secant of work helix angle × cosine of hob helix angle.

In cutting operation, the hob is swiveled on an axis, indicated by point 16 (Fig. 4), arranged in an axial plane H of the work so that the entering end E of the hob is at a distance from said hob swiveling axis 16, substantially equal to one-half B. E. While this method of positioning the hob is particularly advantageous in connection with the use of my new hob, it can also be utilized in the cutting of gears with the heretofore known hobs. For instance, in cutting a herringbone gear with an old type of hob, the hob would be positioned with its axis at the proper angle to the work axis on a swiveling axis arranged in an axial plane of the work, and with the entering end of the hob at a distance from said swiveling axis substantially equal to one-half the continued product of the gear working depth, the cotangent of the gear pressure angle, the secant of the work helix angle and the cosine of the hob helix angle. Such an arrangement of an old type hob would enable a herringbone gear to be cut with a clearance groove substantially narrower than the groove necessary when using the old nob according to the heretofore known method.

Comparing the hob and method of the present invention with said two known methods, it has been demonstrated that a hob constructed in accordance with the invention will cut herringbone gears with clearance grooves of the dimensions shown in Table No. 1 heretofore possible only with multiple thread hobs having inherent inaccuracy and deficient tooth forming and cutting teeth hereinbefore described, which grooves obviously are much smaller than the clearance grooves required with the use of the known single thread hobs as shown in Table No. 2. It will be noted from a reading of these tables in connection with Figure 6 of the drawings, that the dimensions herein referred to are the width of the groove indicated by the letter W, the depth of the groove indicated by U, and the width of the bevel at the edges of the groove indicated by V. The hob of the invention is capable of saving approximately 20 per cent space over the known single thread hobs in a gear of 6 diametrical pitch, while in a gear of 1¾ diametrical pitch the saving in space is approximately 30 per cent, and at the same time has all the advantages of the known type of single thread hob and has none of the disadvantages of the multiple thread hob.

These differences between and advantages of the hob and method of the invention over the known type of single thread hobs are in detail as follows. The known type of single thread hobs used for cutting herringbone gears, were designed primarily and simply to be of a size and strength ample for cutting teeth of the desired size. Such hobs are made unnecessarily long and large in diameter, approximating in length the chord bounding the segment formed by the tooth depth tangent and the periphery of the gear to be cut, for example the length of line 10 in Figure 3 of the drawings between the points of its intersection with the line 6. A hub of this type is placed in a hobbing machine on a swivel substantially central of its length, and when the hob is turned to the proper angle for cutting, the intersection of the hob and gear blank cylinders requires a comparatively wide groove as per Table No. 2 and a large number of teeth at the ends of the hob do not perform any cutting action. In comparison, a hob constructed according to the invention is as short as the tooth cutting action will possibly permit calculated as hereinbefore described, and the diameter is as small as is consistent with the strength required. In accordance with my method, the hob is swiveled as hereinbefore described with the entering end of the hob in such a relation to the work that the points of intersection of the hob and gear blank cylinders are brought nearer the transverse median line of the gear blank than with the known methods so that a comparatively narrower clearance groove is possible, even with a single thread hob of the known type. Furthermore, with a hob constructed and used in accordance with the invention, all teeth of the hob cross the line of tooth action of the gear and serve in the cutting operation.

Figure 2:
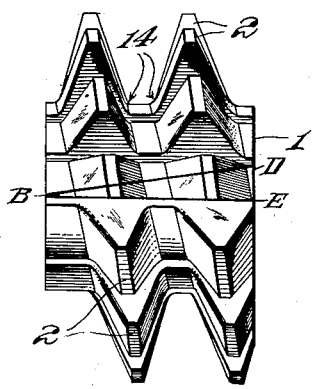
Figure 2 is a side elevation of the hob, showing a modified form of cutting tooth.
Figure 5:
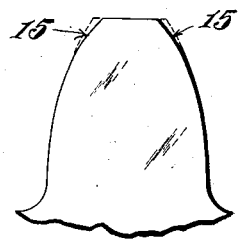
Figure 5 is a diagram of a gear tooth cut with the hob shown in Figure 2.

The teeth of the hob may be made in any suitable form, but I prefer to form the teeth to cut gear tooth curves which will reduce the shock and noise incident to the operation of gears having theoretically correct tooth curves. Thus, the sides of the hob teeth may be curved as at 14 (Fig. 2) to cut away or slightly round off the points of the gear teeth as shown in Figure 5, where the dotted lines indicate the theoretically correct tooth curves, and the solid lines show in exaggerated proportion the tooth as rounded off at 15 by the hob teeth.

It will be understood that the description and drawings are only for the purpose of illustrating the principles of the invention, and that modifications and changes in the construction and use of the invention may be made by those skilled in the art without departing from the spirit or scope thereof. While I have particularly described the hob as used for cutting herringbone gears, the hob is equally well adapted to mold generate gears of the ordinary, spur, helical and worm-wheel type. Therefore, I do not wish to be understood as limiting myself except as required by the following claims when construed in the light of the prior art.

Having thus described the invention, what I claim is:

1. A hob or helical cutter having a helical thread the actual length of which measured in an axial plane of the hob, is substantially equal to the continued product of the thread working depth, the cotangent of the pressure angle, the secant of the work helix angle, and the cosine of the hob helix angle.

2. A hob or helical cutter having a helical thread the length normal of which measured in the plane of work rotation is equal to the product of the working depth of the work and the cotangent of the pressure angle of the desired system.

3. A hob or helical cutter having a single helical thread the length of which measured in the plane of rotation of the work is determined by the points of intersection of the lines of action of both the right and left hand of a helical gear being cut with a tangent to the working depth.

4. A hob or helical cutter having a helical thread the length normal of which is substantially equal to the continued product of the tooth working depth, the cotangent of the pressure angle, and the secant of the work helix angle.

5. A gear tooth generating hob, the length of which is a function of that portion of the line of action included between points of intersection of said line of action with the periphery of the hob working depth cylinder and the periphery of the gear being cut.

6. A gear tooth generating hob the length of which is a function of that portion of the line of action included between the points of intersection of said line of action with the periphery of the hob working depth cylinder and the periphery of the gear being cut, and the angle formed by intersection of the hob thread helix with the hob axis.

7. A hob or helical cutter having helically arranged cutting teeth substantially all of which cross the line of tooth action of the gear being cut.

8. A hob or helical cutter the length normal of which measured in the plane of work rotation is equal to the length of a tangent to the working depth included between the point of intersection of the line of action with said tangent and the projection of the point of intersection of said line of action with the outside circle of the gear being cut upon said tangent at right angles thereto.

9. The method of cutting gears by means of a hob having helically arranged cutting teeth, which consists in mounting the hob on a swiveling axis arranged in an axial plane of the work so that the entering end of the hob is positioned a distance from the hob swiveling axis, substantially equal to one-half the continued product of the gear working depth, the cotangent of the gear pressure angle, the secant of the work helix angle, and the cosine of the hob helix angle.

10. The method of positioning a hob or helical cutter relative to the axis of the work, which consists in mounting the hob on a swiveling axis in an axial plane of the work with the entering end of the hob a distance from the swiveling axis computed from the thread working depth, the pressure angle, the work helix angle and the hob helix angle.

11. The method of cutting gears by means of a hob having helically arranged cutting teeth, which consists in mounting the hob in such a relation to the work that the end tooth at the entering end of the hob crosses the line of action.

ULRICH SETH EBERHARDT.